United States Patent [19]

Verseput et al.

[11] Patent Number: 5,555,510
[45] Date of Patent: Sep. 10, 1996

[54] AUTOMATIC COMPUTER CARD INSERTION AND REMOVAL ALGORITHM

[75] Inventors: Jerry Verseput; Fong-Shek Lam, both of Folsom; Prasanna Shah, Citrus Heights, all of Calif.

[73] Assignee: Intel Corporation, Santa Clara, Calif.

[21] Appl. No.: 284,185

[22] Filed: Aug. 2, 1994

[51] Int. Cl.[6] .................................................. H02H 9/00
[52] U.S. Cl. ................. 364/514 R; 364/240; 364/240.1; 364/927.92; 307/38; 361/58
[58] Field of Search .......................... 364/514 A, 514 B, 364/514 C, 514 R, 240, 240.1, 927.92, 935.41; 395/325; 361/58; 307/38, 39

[56] References Cited

U.S. PATENT DOCUMENTS

| | | | |
|---|---|---|---|
| 4,443,847 | 4/1984 | Bradley et al. | 364/200 |
| 4,485,457 | 11/1984 | Balaska et al. | 364/900 |
| 4,589,063 | 5/1986 | Shah et al. | 364/200 |
| 4,758,951 | 7/1988 | Sznyter, III | 364/200 |
| 4,763,333 | 8/1988 | Byrd | 371/66 |
| 4,831,522 | 5/1989 | Henderson et al. | 364/200 |
| 4,872,139 | 10/1989 | Okamoto et al. | 365/52 |
| 4,907,150 | 3/1990 | Arroyo et al. | 364/200 |
| 4,956,766 | 9/1990 | Dhopeshwarkar et al. | 364/200 |
| 4,982,360 | 1/1991 | Johnson et al. | 364/900 |
| 4,999,787 | 3/1991 | McNally et al. | 364/514 |
| 5,029,077 | 7/1991 | Fatahalian et al. | 364/200 |
| 5,109,510 | 4/1992 | Baker et al. | 395/650 |
| 5,109,521 | 4/1992 | Culley | 395/800 |
| 5,123,098 | 6/1992 | Gunning et al. | 395/400 |
| 5,126,890 | 6/1992 | Wade et al. | 360/60 |
| 5,136,712 | 8/1992 | Perazzoli, Jr. et al. | 395/700 |
| 5,158,473 | 10/1992 | Takahashi et al. | 439/353 |
| 5,161,169 | 11/1992 | Galano et al. | 375/8 |
| 5,161,992 | 11/1992 | Birch | 439/260 |
| 5,182,805 | 1/1993 | Campbell | 395/650 |

(List continued on next page.)

FOREIGN PATENT DOCUMENTS

| 01303692 | 12/1989 | Japan . |
|---|---|---|
| 03186914 | 8/1991 | Japan . |

OTHER PUBLICATIONS

Carr, *Microcomputer Interfacing Handbook: A/D & D/A*, 1980, pp. 295–296.

*Device Driver 'Stubs' Smooth Path to Top SCSI Performance*, by Steve Gibson, Nov. 19, 1990, IDG Communications, Inc., InfoWorld.

*Computer Architecture: A Quantitative Approach*, by John L. Hennessy and David A. Patterson, 1990, Chapter 8, pp. 433–449.

*Primary Examiner*—James P. Trammell
*Assistant Examiner*—Patrick J. Assouad
*Attorney, Agent, or Firm*—Blakely, Sokoloff, Taylor & Zafman

[57] ABSTRACT

A method applicable to a host computer system having a system bus connected to a CPU, and a PCMCIA controller having status registers, means for supplying back off signals to the CPU and line buffers capable of being in a normal and high impedance state. A multi pin connector is located in each card socket and connected to a line buffer. Each connector has common address, data and control pins, power pins, ground pins longer than the data pins and card detect signal pins shorter than the signal pins. The first step is to detect the commencement of an insertion or removal of a PCMCIA card to or from a socket by monitoring the ground and card detect signal pins. After detection, commence termination of all CPU usage of common address, data and control lines by asserting a back off signal. Next, determine if the usage is terminated by monitoring the status registers in the controller. Next, place the common address, data and control lines in a high impedance state. Next, detect that the PC card has been completely inserted or removed by monitoring the ground pins or the card detect signal pins. Next, apply power to the PCMCIA card socket. After a delay return the common address, data and control lines to their normal operating impedance level.

14 Claims, 4 Drawing Sheets

U.S. PATENT DOCUMENTS

| | | | |
|---|---|---|---|
| 5,204,840 | 4/1993 | Mazur | 365/228 |
| 5,210,855 | 5/1993 | Bartol | 395/500 |
| 5,220,211 | 6/1993 | Christopher et al. | 307/443 |
| 5,247,619 | 9/1993 | Mutoh et al. | 395/325 |
| 5,247,682 | 9/1993 | Kondou et al. | 395/700 |
| 5,255,379 | 10/1993 | Melo | 395/400 |
| 5,257,387 | 10/1993 | Richek et al. | 395/800 |
| 5,265,252 | 11/1993 | Rawson, III et al. | 395/700 |
| 5,272,584 | 12/1993 | Austruy et al. | 361/58 |
| 5,276,888 | 1/1994 | Kardach et al. | 395/725 |
| 5,291,585 | 3/1994 | Sato et al. | 395/500 |
| 5,291,604 | 3/1994 | Kardach et al. | 395/725 |
| 5,297,282 | 3/1994 | Meilak et al. | 395/700 |
| 5,303,378 | 4/1994 | Cohen | 395/700 |
| 5,378,930 | 1/1995 | Kuchenreuther | 307/38 |
| 5,379,437 | 1/1995 | Celi, Jr. et al. | 395/750 |
| 5,386,567 | 1/1995 | Lien et al. | 395/700 |

AUTOMATIC COMPUTER CARD INSERTION AND REMOVAL ALGORITHM

CROSS-REFERENCE TO RELATED APPLICATIONS

Please refer to co-pending application Ser. No. 08/243,395 filed on May 16, 1994 by MacGregor and Nelson entitled IMPROVED PERFORMANCE OF ADD IN PRINTED CIRCUIT CARDS FOR COMPUTER SYSTEMS

BACKGROUND OF THE INVENTION

1. Field of the Invention

The subject invention relates to data integrity in a host computer that has more than one PC card socket and has common signal lines running to the sockets. More particularly, it relates to a method of preventing noise imposed on the signal lines from the insertion or removal of a PC card from corrupting data resulting from transactions with other cards sharing the common signal lines.

2. Description of the Prior Art

The most popular PC card conforms to the PCMCIA (Personal Computer Memory Card International Association) standard which was developed to provide user installed memory and I/O functions for small form factor digital computer systems. The standard specifies a card containing a printed circuit board. This product is usually referred to as a PCMCIA card or a PC card. There are three card formats: Types I, II and III. All three have external dimensions of 54 millimeters by 85.6 millimeters. Thicknesses vary. Type I is 3.3 millimeters thick. Type II is 5 millimeters thick and Type III is 10.5 millimeters thick. The host computer contains one or more sockets into which the PC cards may be inserted. Electrical contact between the host and the PC card is through a 68 pin connector which is also specified by the standard. The PCMCIA standard specifies the function of each of the 68 pins in the connector and supports either an 8 bit or 16 bit bus. There are four ground pins, two power pins and up to 3 free signal pins for additional functions. Communication with the outside world is through an I/O connector which is not specified by the standard.

PCMCIA cards are becoming increasingly popular which has led systems manufacturers to include multiple sockets in the host computer. Typically, in such systems, a unique set of address, data and control signal lines is routed to each PC card socket. However, this is expensive. In an effort to reduce costs, some manufacturers are routing common data, address and some signal lines to all PC card sockets. While less expensive, this design has another problem. When a PC card is inserted or removed, it creates noise on the common signal lines. With the non- shared signal line design, the insertion or removal of a PC card from one socket would not affect transactions occurring simultaneously and involving other PC cards. But if signal lines are shared between multiple sockets, insertion or removal from one socket may cause noise on the common signal lines which may in turn corrupt data resulting from transactions occurring simultaneously through other sockets.

In order to solve this problem, prior art systems required the user to guarantee that no transactions were occurring during PC card insertion or removal. Typically, a LED is provided to alert the user to transactions occurring through other sockets, and therefore an insertion or removal should not be attempted. This approach is however totally dependent on the alertness of the user for its effectiveness.

SUMMARY OF THE INVENTION

It is therefore an object of the invention to insure data integrity in a host computer system having multiple PC card sockets with common address, data and control signal lines during the insertion or removal of a PC card.

It is another object of the invention to provide a method of insuring such data integrity that is totally independent of user involvement It is yet another object of the invention to detect the insertion of a PC card into a PC card slot by monitoring signal levels on the ground pins in the 68 pin connector.

It is yet another object of the invention to detect the removal of a PC card from a PC card slot by monitoring signal levels on the card detect signal pins in the 68 pin connector.

Finally, it is an object of this invention to allow a user to insert or remove a PC card at any time without corrupting transactions that may be occurring on other sockets in the system.

These and other objects of the invention may be achieved in a method of operating a host computer system a system bus which is connected to a CPU, a system memory and a PCMCIA controller having a status register, means for supplying back off signals to the CPU and a plurality of line buffers capable of being in a normal and high impedance state, and a plurality of add in PC card sockets for receiving PC cards, said sockets having multi pin connector that includes common address, data and control lines as well as power, ground and card detect signal pins connected to the line buffers. The method comprises (1) detecting that the insertion of a PC card into a socket has commenced; (2) commence termination of all usage by the CPU of the common address, data and control lines which is accomplished by asserting a back off signal to the CPU; (3) determining if the termination of all usage by the CPU is complete by monitoring the status registers in the controller; (4) placing the common address, data and control lines in a high impedance state; (5) detecting that the PC card has been completely inserted; (6) applying power to the PC card socket from the host; (7) after a delay of a predetermined period to allow the power to stabilize, the common address, data and control lines are returned to their normal operating impedance level.

The method also applies to the removal of a PC card from a PC Card socket. The method as applied to the removal of a PC card comprises (1) detecting the commencement of the removal of a PC card from a PC card socket; (2) commencing termination of all usage by the CPU of the common address, data and control lines by asserting a back off signal to the CPU; (3) determining if the termination of all usage by the CPU is complete by monitoring the status registers in the controller; (4) placing the common address, data and control lines in a high impedance state; (5) detecting that the PC card has been completely removed; and (6) returning the common address, data and control lines to their normal operating impedance level.

BRIEF DESCRIPTION OF THE DRAWING

The invention will now be described in detail in conjunction with the drawing in which.

DETAILED DESCRIPTION OF THE PREFERRED EMBODIMENT

Figure 1:
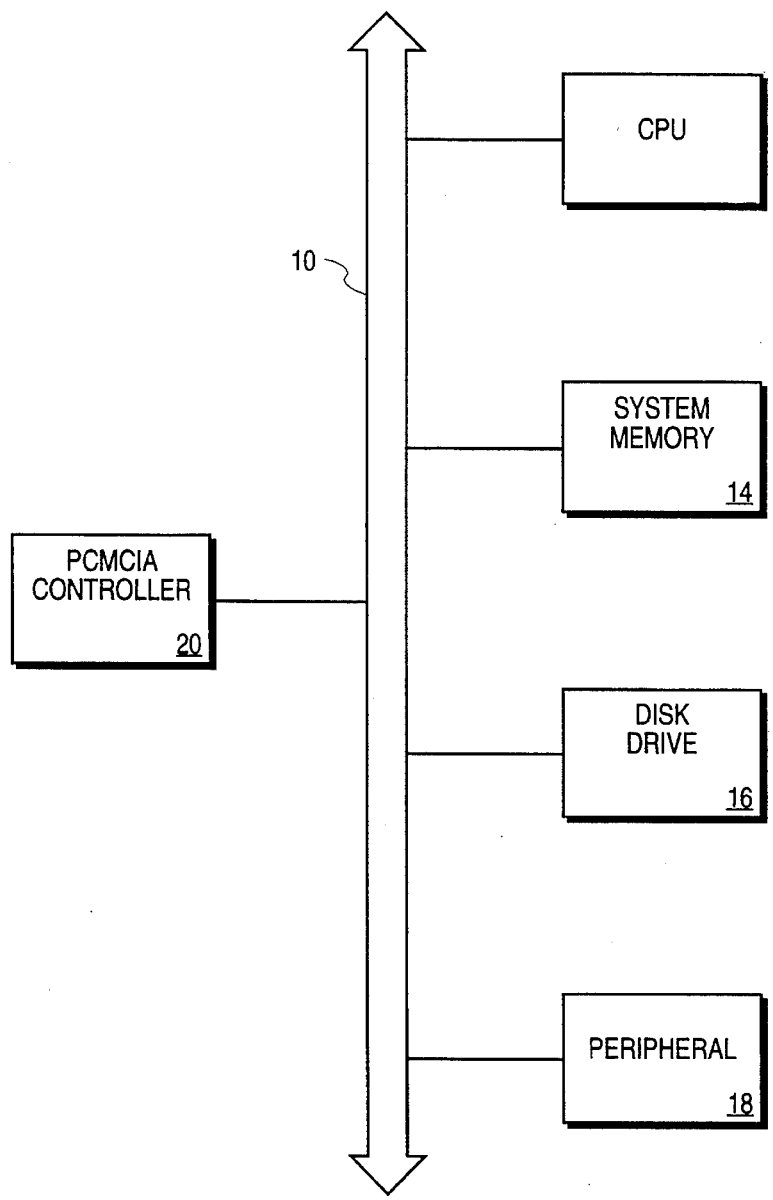
FIG. 1 is a block diagram of a computer system with an add in PC card functionality.

FIG. 1 is a block diagram of a computer system which has the facility to host PCMCIA or other, similar add in PC cards. Referring now to FIG. 1, a bus 10 is connected to a CPU 12, a system memory 14, a disk drive for mass memory 16 and a peripheral device 18. In addition to the foregoing components which form a conventional computer system, bus 10 is connected to a PC card controller 20.

Figure 2:
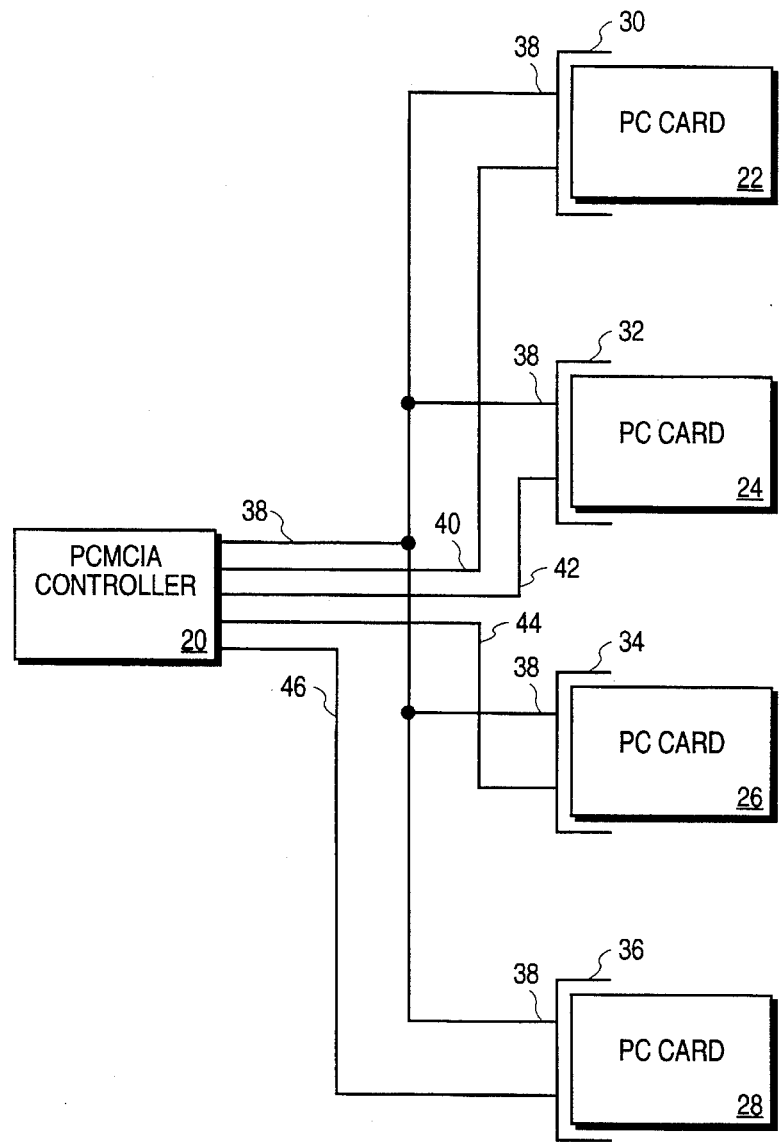
FIG. 2 is a block diagram of a PC card controller and a plurality of controlled sockets.

FIG. 2 is a block diagram of a PC card controller and a plurality of controlled sockets. Referring now to FIG. 2, PC cards 22, 24, 26 and 28 fit into sockets 30, 32, 34 and 36 respectively. Address, data and certain control signal lines are combined into a bus and routed to each socket and to controller 20. This bus is indicated by reference numeral 38 in FIG. 2. Separate control signals are supplied from controller 20 to sockets 30, 32, 34 and 36 via leads 40, 42, 44 and 46 respectively. The address, data and control lines are driven by buffers within controller 20. The buffers normally operate at impedance levels that match the logic with which they interface; however the buffers are designed such that they may be placed in a high impedance state. That is, the buffers may be turned off such that they appear as an open circuit to circuitry connected to the other end of the address, data and control lines. This is desirable to protect the circuitry in the PC card during the insertion and removal process. A detailed description of the general arrangement of electrical and mechanical interface between a socket and an add in PC card is provided in the copending application referenced in the first section hereof.

Controller 20 schedules all transactions between the host and the PC cards. That is, controller 20 queues transactions requested by the host and insures that signals relating to only one transaction appear on the common data and address lines at one time. Controller 20 is also designed to send back off signals to the host CPU that indicate that the controller cannot accept new tasks either because its queue is full or the sockets are inoperable. Controller 20 also contains status registers that indicate the status of tasks queued up for execution.

Figure 3:
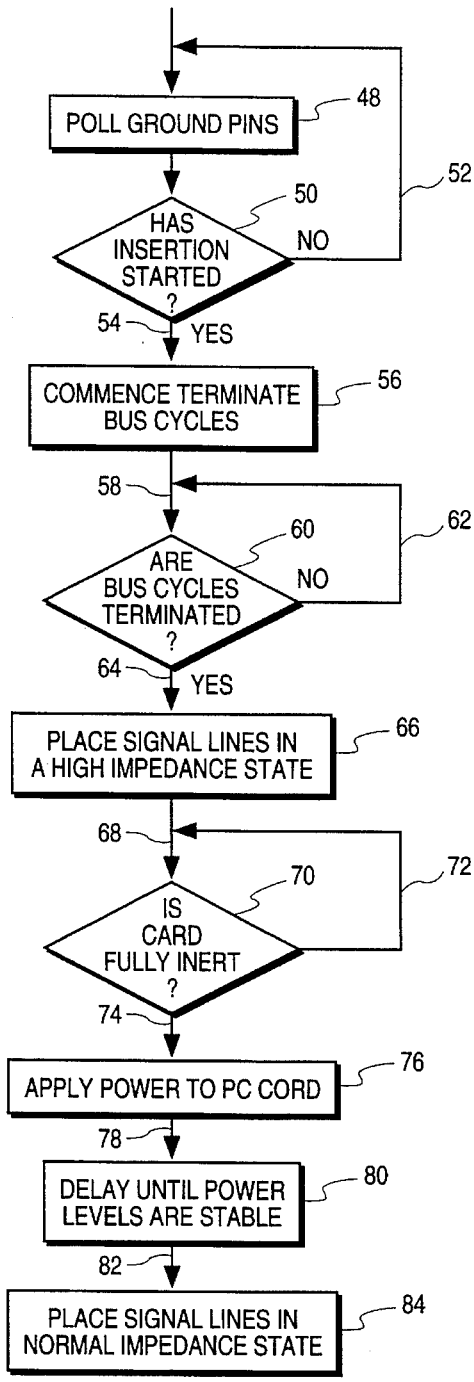
FIG. 3 is a flow chart of the method of the present invention as it relates to a PC card being inserted into a socket.

FIG. 3 is a flow chart of the method of the present invention as it applies to the insertion of a PC card. The conditions of the computer prior to the beginning of the process consist of having one or more, but not all, PC cards 22, 24, 26 or 28 plugged into sockets 30, 32, 34 or 36.

In the 68 pin connector specified by the PC standard there are card detect signal pins that are shorter than the normal signal pins in the connector. And the ground pins in the PC connector are longer than the normal signal pins. During PC card insertions, a ground pin can be used as an insertion detector since it will be the first pin to make contact. To do this, the ground pin(s) are forced to a logic "1" when a PC card is not inserted in the socket. However, this is done by a means that can easily be overcome by a direct connection to ground. Such a means could be a pull-up resistor. Detection of the ground pin making contact gives controller 20 several milliseconds of advance warning of an impending insertion. The card detect signals can be used to indicate when the PC card's signal pins have become engaged with the socket of the connector. During PC card removals, the card detect pins provide the advance warning of an impending removal to controller 20. The ground pins then can be used to indicate when the PC card's signal pins have been fully disengaged from the socket portion of the 68 pin connector.

Referring now to FIG. 3, processing block 48 periodically polls one or more ground pins in the 68 pin connector. Decision block 50 tests for the presence of a logic "0" indicating that a PC card is being inserted into one of the sockets of FIG. 2. If the logic "0" is not present, follow process path 52 back to processing block 48. If the logic "0" is present, follow signal path 54 to processing block 56. In processing block 56, commence the orderly termination of all bus cycles. That is, controller 20 allows for the completion of the current transaction, as well as any pending transactions, but it does not accept any new transactions from the host. From processing block 56 follow process path 58 to decision block 60. Decision block 60 tests for the termination of all bus cycles. This can be done by polling the circuitry internal to the controller 20 that is responsible for scheduling transactions. If no, follow process path 62 back to decision block 60. If yes, follow process path 64 to process block 66. In process block 66, all address, data and control signal lines comprising signal bus 38 between controller 20 and sockets 30, 32, 34 and 36 in FIG. 2 are placed in a high impedance state in order to protect the electronics on the PC card being inserted. Placing the signal lines in a high impedance state means shutting off the signal drivers in controller 20 such that they are no longer driving the common signals. From processing block 66, the method follows process path 68 to decision block 70 which tests to determine if a signal is present on a card detect signal pin. If so, this indicates that the PC card is fully inserted. If there is no signal on a card detect signal pin, the PC card has not yet been fully inserted and follow process path 72 back to decision block 70. If there is a signal on a card detect signal pin, follow process path 74 to processing block 76. In process block 76, the power from a power supply in the host (not shown) is turned on and the PC card is powered up. From process block 76 follow process path 78 to process block 80. In process block 80, a predetermined delay is counted, for example 7 microseconds, which is the predetermined time required for power levels to stabilize to within 95% of nominal. At this point, normal processing may continue which is illustrated by following process path 82 to processing block 84.

Figure 4:
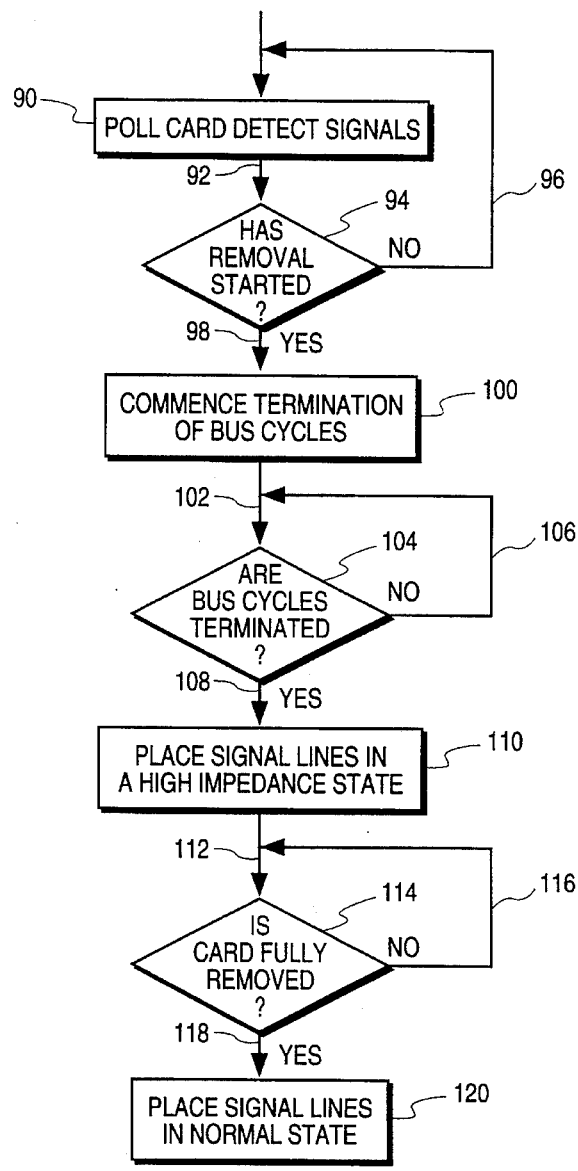
FIG. 4 is a flow chart of the method of the present invention as it relates to a PC card being removed from a socket.

Referring now to FIG. 4, processing block 90 periodically polls the signals on the card detect pins. From processing block 90 follow process path 92 to decision block 94 which tests the signals polled in processing block 90 to provide an indication that a PC card is being removed from one of sockets 30, 32, 34 or 36 of FIG. 2. If the signal is low, follow process path 96 back to processing block 90 and repeat. If the signal is high, follow process path 98 to processing block 100. In this process step, commence the orderly termination of all bus cycles. From processing block 100 follow process path 102 to decision block 104. Decision block 104 tests for the termination of all bus cycles. If the bus cycles are not terminated, follow process path 106 back to decision block 104. If the bus cycles are complete, follow process path 108 to process block 110. In process block 108, all common address, data and control lines are placed in a high impedance state. From processing block 110, follow process path 112 to decision block 114 which tests to determine if the removal of the PC card is complete by monitoring the high state on the ground pins. If the PC card is not yet completely removed, follow process path 116 back to decision block 114. If the PC card is completely removed, follow process path 118 to processing block 120. In process block 120, the signal lines are placed in their normal impedance mode. At this point, normal processing may continue.

What is claimed is:

1. In a method of operating a host computer system having at least a system bus which is connected to a CPU, a system memory and a controller having status registers and means for supplying back off signals indicating that new tasks cannot be accepted to the CPU and a plurality of line buffers capable of being in a normal and high impedance state, and a plurality of add in PC card sockets for receiving PC cards connected to said controller, said sockets each having a multi pin connector that includes common address, data and control lines as well as power, ground and card detect signal pins connected to said line buffers, the steps comprising:

detecting the commencement of an insertion of a PC card into a socket;

upon detection of said commencement of an insertion of a PC card into a socket, commencing orderly termination of all usage by said CPU of said common address, data and control lines;

determining that all usage by said CPU of said common address, data and control lines is complete;

placing said common address, data and control lines in a high impedance state;

detecting the completion of said insertion of said PC card into said PC card socket;

applying power to said power pins in said connector in said PC card socket;

delaying a predetermined period of time; and returning said common address, data and control lines to their normal operating impedance level.

2. The method of claim 1 wherein detecting the commencement of an insertion of a PC card into a socket comprised polling said ground pin.

3. The method of claim 2 wherein detecting the completion of an insertion of a PC card into a socket comprised determining if a signal is present on said card detect signal pin.

4. The method of claim 3 wherein terminating all usage by said CPU of said common address, data and control lines comprises sending a back off signal from said controller to said CPU and allowing completion of any current transaction.

5. The method of claim 4 wherein determining that all usage by said CPU of said common address, data and control lines is complete comprises monitoring said status register in said controller for an indication that all tasks have been completed.

6. The method of claim 1 wherein said predetermined delay period is sufficient for power levels to stabilize to within 95% of nominal.

7. In a method of operating a host computer system having at least a system bus which is connected to a CPU, a system memory and a controller having status registers and means for supplying back off signals indicating that new tasks cannot be accepted to the CPU and a plurality of line buffers capable of being in a normal and high impedance state, and a plurality of add in PC card sockets for receiving PC cards connected to said controller, said sockets each having a multi pin connector that includes common address, data and control lines as well as power, ground and card detect signal pins connected to said line buffers, the steps comprising: detecting the commencement of the removal of a PC card from a PC card socket;

upon detection of said commencement of said removal of a PC card from a socket, commencing orderly termination of all usage by said CPU of said common address, data and control lines;

determining that all usage by said CPU of said common address, data an control lines is complete;

placing said common address, data and control lines in a high impedance state;

detecting the completion of said removal of said PC card into a PC card socket; and upon detecting the completion of said removal of said PC card into a PC card socket, returning said common address, data and control lines to their normal operating impedance level.

8. The method of claim 7 wherein detecting the commencement of said removal of a PC card from a socket comprises polling said card detect signal pin.

9. The method of claim 8 wherein detecting the completion of a removal of a PC card from a socket comprises polling said ground pin.

10. In a method of operating a host computer system having at least a system bus which is connected to a CPU and system memory and having a plurality of add in PC card sockets for receiving PC cards, said sockets being connected by common address, data and control lines through a controller to said system bus, and wherein each socket has a first state in which a PC card is fully inserted and a second state in which a PC card is fully disengaged, the steps comprising:

automatically detecting the commencement of a change of state of a socket;

upon detection of said commencement of said change of state, orderly terminating all usage by said CPU of said common address data and control lines;

after said orderly termination, placing said common address, data and control lines in a high impedance state;

detecting the completion of said change of state; and after said completion detection, returning said common address, data and control lines to their normal operating impedance level.

11. The method of claim 9 wherein detecting the commencement of an insertion of a PC card into a socket comprised polling said ground pin.

12. The method of claim 11 wherein detecting the completion of an insertion of a PC card into a socket comprised determining if a signal is present on said card detect signal pin.

13. The method of claim 12 wherein terminating all usage by said CPU of said common address, data and control lines comprises sending a back off signal from said controller to said CPU and allowing completion of any current transaction.

14. The method of claim 13 wherein said predetermined delay period is sufficient for power levels to stabilize to within 95% of nominal.

* * * * *